(12) United States Patent
Fujita et al.

(10) Patent No.: US 6,494,950 B1
(45) Date of Patent: Dec. 17, 2002

(54) THERMOCHROMIC MICROENCAPSULATED PIGMENTS

(75) Inventors: Katsuyuki Fujita, Aichi (JP); Kuniyuki Senga, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 0 days.

(21) Appl. No.: 09/664,062

(22) Filed: Sep. 18, 2000

(30) Foreign Application Priority Data

Sep. 17, 1999 (JP) .......................................... 11-263391
Apr. 28, 2000 (JP) ....................................... 2000-129591

(51) Int. Cl.[7] .......................... B41M 5/30; C09K 9/00; C09B 67/02
(52) U.S. Cl. ...................... 106/499; 106/504; 252/962; 374/162; 428/402.2; 428/913; 503/200; 503/204; 503/208; 503/209; 503/213
(58) Field of Search .................... 106/499, 504; 252/962; 374/162; 428/402.2, 913; 503/200, 204, 208, 209, 213

(56) References Cited

U.S. PATENT DOCUMENTS

| 4,028,118 A | 6/1977 | Nakasuji et al. ............... 106/21 |
| 4,617,582 A | 10/1986 | Miyauchi et al. ........... 346/208 |
| 4,681,791 A | 7/1987 | Shibahashi et al. ............ 428/96 |
| 4,720,301 A | 1/1988 | Kito et al. ..................... 106/21 |
| 4,732,810 A | 3/1988 | Kito et al. ................ 428/402.2 |
| 5,558,699 A | 9/1996 | Nakashima et al. ...... 106/21 A |
| 5,879,443 A | 3/1999 | Senga et al. ................. 106/498 |

FOREIGN PATENT DOCUMENTS

| EP | 0 677 564 A2 | 10/1995 |
| GB | 2178 183 A | 2/1987 |

OTHER PUBLICATIONS

XP–002173568 (Feb. 10, 1995) abstract of JP 7–40660.
European Search Report dated Aug. 22, 2001.

*Primary Examiner*—Anthony J. Green
(74) *Attorney, Agent, or Firm*—Sughrue Mion, PLLC

(57) ABSTRACT

Disclosed is a thermochromic microencapsulated pigment which comprises as four essential components (a) an electron-donating chromatic organic compound, (b) an electron-accepting compound, (c) a reaction medium determining the temperatures at which the color reactions of component (a) with component (b) take place, and (d) a color change temperature regulator, the color change temperature regulator (d) comprising one or more compounds selected from the group consisting of esters, alcohols, ketones, acid amides, hydrocarbons, and fatty acids and having a melting point Y (° C.) satisfying the relationship $(X+30)° C. \leqq Y \leqq 200° C.$, wherein X (° C.) is the melting point of component (c), and the four essential components being microencapsulated.

5 Claims, 2 Drawing Sheets

THERMOCHROMIC MICROENCAPSULATED PIGMENTS

FIELD OF THE INVENTION

The present invention relates to thermochromic microencapsulated pigments. More particularly, the invention relates to microencapsulated pigments comprising microcapsules containing a composition reversibly undergoing color changes with temperature.

BACKGROUND OF THE INVENTION

Several proposals have hitherto been disclosed on a composition which begins to change from a colored state to a decolored state upon heating, comes into a completely decolored state at temperatures not lower than a specific temperature, begins to color upon subsequent cooling, and returns to the colored state.

Such compositions can be roughly classified into two types. The first type changes in color at a color change temperature in such a manner that at ordinary temperature the composition exists only in specific one of the two states respectively corresponding to both sides of the color change temperature. Namely, the other state is maintained only during the period in which the heat or cold required for the development of this state is kept being applied, and the composition return to the original ordinary-temperature state upon removal of the heat or cold. This type of composition is hence a thermochromic composition which gives a temperature-color density curve showing that it undergoes color changes with a relatively narrow hysteresis range ($\Delta H$) (see, for example, U.S. Pat. Nos. 4,028,118 and 4,732,810).

The second type changes in color along routes which differ considerably between the case in which the composition is heated from a temperature on the lower-temperature side of a color change temperature range and in the reverse case in which the composition is cooled from a temperature on the higher-temperature side of the color change temperature range. This type of composition gives a temperature-color density curve showing that it undergoes color changes with a wide hysteresis range ($\Delta H$) Namely, this type of composition is a thermochromic color-memorizing composition in which the colors respectively formed at a temperature not higher than the lower trigger temperature and at a temperature not lower than the higher trigger temperature can be alternately memorized and retained in the temperature range between the lower trigger temperature and the higher trigger temperature even after the heat or cold required for the color change has been removed (see U.S. Pat. Nos. 4,720,301, 5,879,443, and 5,558,699).

The compositions described above have a color change behavior such as that shown by the temperature-color density curve given in FIG. 1, although they vary in the width of hysteresis range ($\Delta H$). This color change behavior is ascribable to and specified by a reaction medium (c) which determines the temperatures at which the color reactions of an electron-donating chromatic organic compound (a) with an electron-accepting compound (b) take place.

SUMMARY OF THE INVENTION

The compounds effectively usable as the reaction medium (c) are limited in kind. In addition, in systems containing effective compounds, there has been no means for shifting the temperature-color density curve. Namely, it has been difficult to delicately regulate color change temperatures, and the conventional compositions have not always had intended color change properties.

The present inventors made intensive investigations on thermochromic compositions. As a result, they have found that the temperature-color density curve can be delicately modified by incorporating a specific compound as the fourth component. The invention has been completed based on this finding.

An object of the invention is to provide thermochromic microencapsulated pigments in which the color change properties of a conventional three-component system comprising components (a), (b), and (c) have been regulated, as a base, with respect to color change temperature. The pigments of the invention are applicable to a variety of fields including temperature indication, decoration, toys, and teaching material elements.

The invention provides a thermochromic microencapsulated pigment which contains as four essential components (a) an electron-donating chromatic organic compound, (b) an electron-accepting compound, (c) a reaction medium determining the temperatures at which the color reactions of component (a) with component (b) take place, and (d) a color change temperature regulator, the color change temperature regulator (d) comprising one or more compounds selected from esters, alcohols, ketones, acid amides, hydrocarbons, and fatty acids and having a melting point Y (° C.) satisfying the relationship $(X+30)° C. \leq Y \leq 200° C.$, wherein X (° C.) is the melting point of component (c), and the four essential components being microencapsulated. In preferred embodiments of the pigment of the invention described above, the color change temperature regulator (d) is selected from aliphatic esters, aliphatic ketones, aliphatic alcohols, aliphatic acid amides, and saturated fatty acids; the color change temperature regulator (d) is contained in an amount of from 0.01 to 0.3 part by weight per part by weight of the reaction medium (c); the microencapsulated pigment has an average particle diameter in the range of from 0.01 to 6 μm; and the pigment gives a temperature-color density curve showing that the pigment undergoes color changes with a hysteresis range ($\Delta H$) of 5° C. or narrower.

The invention further provides a thermochromic color-memorizing microencapsulated pigment which contains as four essential components (a) an electron-donating chromatic organic compound, (b) an electron-accepting compound, (c) a reaction medium determining the temperatures at which the color reactions of component (a) with component (b) take place, and (d) a color change temperature regulator, the color change temperature regulator (d) comprising one or more compounds selected from ethers, esters, ketones, acid amides, and fatty acids and having a melting point Y (° C.). satisfying the relationship $(X+16)° C. \leq Y \leq (X+100)° C.$, wherein X (° C.) is the melting point of component (c), and the four essential components being microencapsulated, and which gives a temperature-color density curve showing that the pigment undergoes color changes with a hysteresis range ($\Delta H$) having a width of from 5° C. to 80° C., and in which the colors thereof respectively in a range of temperatures not higher than the lower trigger temperature and in a range of temperatures not lower than the higher trigger temperature are alternately memorized and retained by the pigment in the temperature range between the lower trigger temperature and the higher trigger temperature. The invention furthermore provides a thermochromic color-memorizing microencapsulated pigment which contains as four essential components (a) an electron-donating chromatic organic compound, (b) an electron-accepting compound, (c) a reaction medium determining the temperatures at which the color reactions of component (a) with component (b) take place, and (d) a color change temperature regulator, the color change temperature regulator (d) comprising one or more compounds selected from ethers, esters, and fatty acids and having a melting point Y (° C.) satisfying the relationship $(X-10)° C. \leq Y \leq (X+15)°$ C., wherein X (° C.) is the melting point of component (c), and the four essential components being microencapsulated, and which gives a temperature-color density curve showing that the pigment undergoes color changes with a hysteresis range ($\Delta H$) having a width of from 5° C. to 80° C., and in which the colors thereof respectively in a range of temperatures not higher than the lower trigger temperature and in a range of temperatures not lower than the higher trigger temperature are alternately memorized and retained by the pigment in the temperature range between the lower trigger temperature and the higher trigger temperature.

In a preferred embodiment of the two pigments of the invention described above, the color change temperature regulator (d) is contained in an amount of from 0.01 to 0.3 part by weight per part by weight of the reaction medium (c).

DETAILED DESCRIPTION OF THE INVENTION

The thermochromic microencapsulated pigments will be explained below in detail with respect to the hysteresis characteristics thereof shown in a color density-temperature curve.

Figure 1:
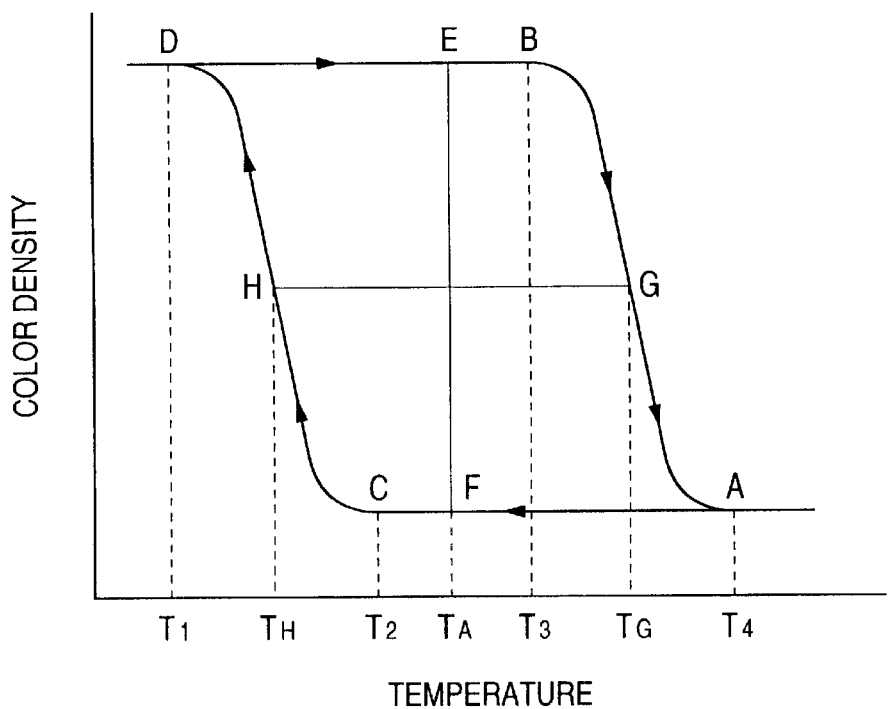
FIG. 1 is a presentation showing a temperature-color density curve of a microencapsulated pigment containing a thermochromic composition.

In FIG. 1, color density is plotted as ordinate and temperature is plotted as abscissa. Changes in color density with temperature proceed along the arrows. Point A indicates the color density at the lowest temperature $T_4$ at which a completely decolored state is reached (hereinafter referred to as complete-decoloration temperature). Point B indicates the color density at the highest temperature $T_3$ at which a completely colored state can be retained (hereinafter referred to as decoloration initiation temperature). Point C indicates the color density at the lowest temperature $T_2$ at which the completely decolored state can be retained (hereinafter referred to as coloration initiation temperature). Furthermore, point D indicates the color density at the highest temperature $T_1$ at which the completely colored state is reached (hereinafter referred to as complete-coloration temperature).

At temperature $T_A$, two phases, i.e., a colored state corresponding to point E and a decolored state corresponding to point F, coexist. In a temperature range including this temperature $T_A$ wherein the colored state and the decolored state can coexist, the composition can retain the colored or decolored state. The length of the segment EF is a measure of the contrast between the colored and the decolored states, while the length of the segment HG, which passes through the middle point of the segment EF, is the temperature range width indicating the degree of hysteresis (hereinafter referred to as hysteresis range $\Delta H$). At ordinary temperature, a composition having a small value of $\Delta H$ (below 5° C.) can exist only in specific one of the two states respectively observed before and after a color change.

In particular, thermochromic compositions having a small value of $\Delta H$ are used in applications such as indicators due to their color change characteristics, and the regulation of color change temperature is important for these.

In the case of thermochromic compositions having a large value of $\Delta H$ (5° C. to 80° C.), each of the states respectively observed before and after a color change can be readily retained.

The temperature range wherein two phases respectively in a colored state and a decolored state are substantially retained, i.e., the temperature range between $T_3$ and $T_2$ including $T_A$, is practically effective when it has a width of from 2° C. to less than 80° C.

According to one aspect of the invention, four essential components are microencapsulated which consist of (a) an electron-donating chromatic organic compound, (b) an electron-accepting compound, (c) a reaction medium determining the temperatures at which the color reactions of component (a) with component (b) take place, and (d) one or more high-melting compounds selected from esters, alcohols, ketones, acid amides, and hydrocarbons and having a melting point Y (° C.) satisfying the relationship $(X+30)° C. \leq Y \leq 200° C.$, preferably satisfying the relationship $(X+35)° C. \leq Y \leq 150° C.$, wherein X (° C.) is the melting point of component (c). A feature of this constitution resides in that lower-temperature-side color change points can be delicately regulated so as to shift toward the higher-temperature side.

Figure 2:
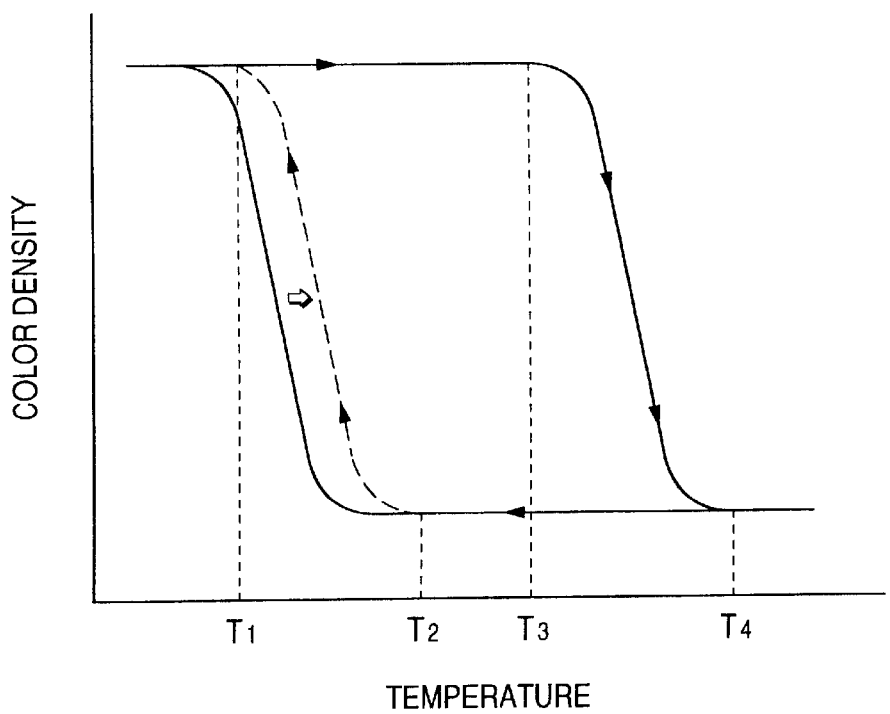
FIG. 2 is a presentation showing a temperature-color density curve of a thermochromic microencapsulated pigment of the invention in which lower-temperature-side color change points of a conventional thermochromic microencapsulated pigment have been shifted toward the higher-temperature side.

An explanation on this point is as follows. The incorporation of component (d) shifts $T_1$ (complete-coloration temperature) and $T_2$ (coloration initiation temperature) toward the higher-temperature side as shown by the broken line in the color density-temperature curve given in FIG. 2.

The temperatures to which $T_1$ and $T_2$ are shifted can be regulated to any desired values by changing the kind and addition amount of component (d), i.e., the color change temperature regulator.

In case where the melting point of component (d) is lower than that of component (c) by at least 30° C., it is difficult to produce the desired function of color change temperature regulation. Furthermore, addition of an ingredient having a melting point exceeding 200° C. may impair thermochromic sensitivity.

The thermochromic composition described above is microencapsulated so as to obtain a thermochromic material which is chemically and physically stable. Namely, the composition is used in the form of a thermochromic microencapsulated pigment. However, the thermochromic composition which has been microencapsulated may have drawbacks concerning color changes with temperature, in particular the color change behavior during cooling, depending on the particle diameter distribution of the microcapsules.

Figure 3:
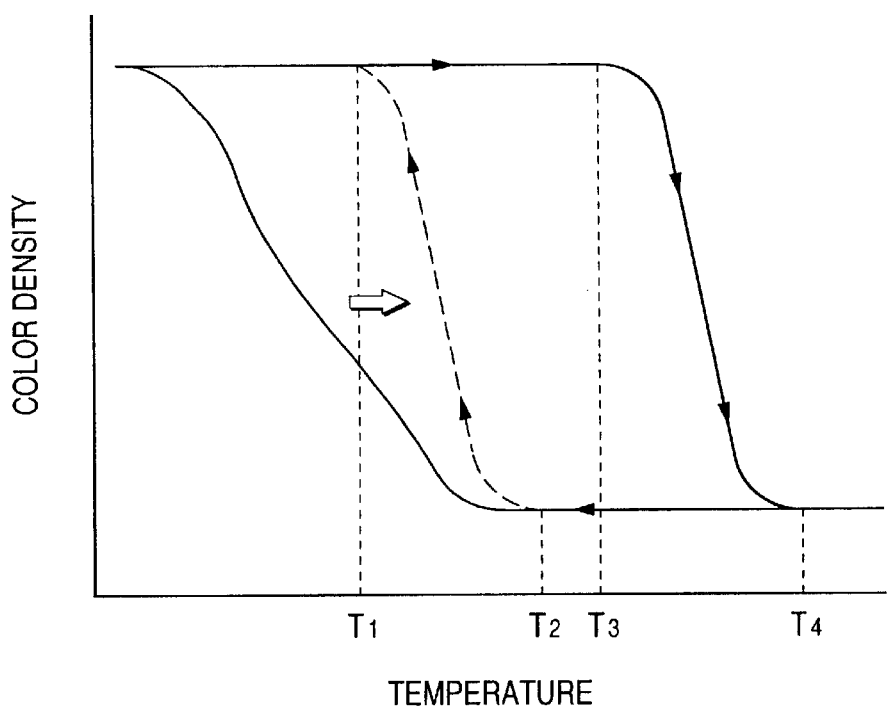
FIG. 3 is a presentation showing a temperature-color density curve of a thermochromic microencapsulated pigment of the invention in which lower-temperature-side color change points of a conventional thermochromic microencapsulated pigment having a small particle diameter have been shifted toward the higher-temperature side.

Such drawbacks are as follows. Microencapsulated pigments are produced so as to have particle diameters of mostly from 1 to 50 μm, preferably from 1 to 30 μm, although their sizes vary depending on applications. However, these pigments have fluctuations in particle diameter. Not all the microencapsulated pigments have particle diameters within that range, and some microencapsulated pigments have particle diameters larger than the upper limit or smaller than the lower limit. Microencapsulated pigments having particle diameters of about from 0.01 to 3 μm are applicable to process printing inks for high-mesh separation, inks for writing utensils, etc. However, since component (c) has the property of supercooling, the microencapsulated composition upon cooling is colored at a temperature lower by from 2 to 30° C. than the temperature at which microencapsulated pigments containing the same composition but having a larger particle diameter are colored during cooling, or is colored stepwise and does not show a distinct color change, as shown by a solid line in the color density-temperature curve given in FIG. 3. Namely, the intended color change characteristics are difficult to obtain.

However, the incorporation of component (d) in the microencapsulated pigment described above having a small particle diameter elevates the cloud point of the thermochromic composition and improves the crystallinity of the composition itself, whereby the supercooling properties of component (c) are reduced. As a result, $T_1$ (complete-coloration temperature) and $T_2$ (coloration initiation temperature) are shifted toward the higher-temperature side and the pigment shows a satisfactory color change behavior with a distinct color change, as shown by the broken line in the color density-temperature curve given in FIG. 3.

Component (d) is explained next.

Examples of aliphatic esters, which are preferred among the esters usable as component (d), include stearyl laurate, eicosyl stearate, docosyl laurate, tetracosyl laurate, hexacosyl laurate, octacosyl laurate, triacontyl laurate, cetyl myristate, stearyl myristate, eicosyl myristate, docosyl myristate, tetracosyl myristate, hexacosyl myristate, octacosyl myristate, triacontyl myristate, lauryl palmitate, tridecyl palmitate, myristyl palmitate, cetyl palmitate, stearyl palmitate, eicosyl palmitate, docosyl palmitate, tetracosyl palmitate, hexacosyl palmitate, octacosyl palmitate, triacontyl palmitate, undecyl stearate, lauryl stearate, tridecyl stearate, myristyl stearate, cetyl stearate, stearyl stearate, eicosyl stearate, docosyl stearate, tetracosyl stearate, hexacosyl stearate, octacosyl stearate, triacontyl stearate, octyl eicosanate, decyl eicosanate, undecyl eicosanate, tridecyl eicosanate, myristyl eicosanate, cetyl eicosanate, stearyl eicosanate, eicosyl eicosanate, docosyl eicosanate, tetracosyl eicosanate, hexacosyl eicosanate, octacosyl eicosanate, triacontyl eicosanate, methyl behenate, propyl behenate, butyl behenate, hexyl behenate, octyl behenate, decyl behenate, undecyl behenate, lauryl behenate, tridecyl behenate, myristyl behenate, cetyl behenate, stearyl behenate, eicosyl behenate, docosyl behenate, tetracosyl behenate, hexacosyl behenate, octacosyl behenate, triacontyl behenate, ditridecyl oxalate, dimyristyl oxalate, dicetyl oxalate, distearyl oxalate, dieicosyl oxalate,dimyristyl malonate, dicetyl malonate, distearyl malonate, dieicosyl malonate, ditridecyl succinate, dimyristyl succinate, dicetyl succinate, distearyl succinate, dieicosyl succinate, ditridecyl glutarate, dimyristyl glutarate, dicetyl glutarate, distearyl glutarate, dieicosyl glutarate, ditridecyl adipate, dimyristyl adipate, dicetyl adipate, distearyl adipate, dieicosyl adipate, ditridecyl suberate, dimyristyl suberate, dicetyl suberate, distearyl suberate, dieicosyl suberate, dilauryl sebacate, ditridecyl sebacate, dimyristyl sebacate, dicetyl sebacate, distearyl sebacate, and dieicosyl sebacate.

Further, 1,10-decanedilauryl, 1,10-decanedimyristyl, 1,10-dodecanedicetyl, 1,10-decanedistearyl, 10-decanedieicosyl, 1,10-decanedidocosyl, 1,12-dodecanedilauryl, 1,12-dodecanedimyristyl, 1,12-dodecanedicetyl, 1,12-dodecanedistearyl, 1,12-dodecanedieicosyl, 1,12-dodecanedidocosyl, 1,14-tetradecanedilauryl, 1,14-tetradecanedimyristyl, 1,14-tetradecanedicetyl, 1,14-tetradecanedistearyl, 1,14-tetradecanedieicosyl, 1,14-tetradecanedidocosyl, 1,16-hexadecanedilauryl, 1,16-hexadecanedimyristyl, 1,16-hexadecanedicetyl, 1,16-hexadecanedistearyl, 1,16-hexadecanedieicosyl, 1,16-hexadecanedidocosyl, 1,18-octadecanedilauryl, 1,18-octadecanedimyristyl, 18-octadecanedicetyl, 1,18-octadecanedistearyl, 1,18-octadecanedieicosyl, 1,18-octadecanedidocosyl, trimyristin, tripalmitin, tristearin, or trinonadecanoin may be used.

Examples of aliphatic alcohols, which are preferred among the alcohols usable as component (d), include pentadecyl alcohol, cetyl alcohol, heptadecyl alcohol, stearyl alcohol, nonadecyl alcohol, eicosyl alcohol, docosyl alcohol, tetracosyl alcohol, hexacosyl alcohol, and octacosyl alcohol.

Examples of aliphatic ketones, which are preferred among the ketones usable as component (d), include dioctyl ketone, dinonyl ketone, diundecyl ketone, ditridecyl ketone, dipentadecyl ketone, diheptadecyl ketone, phenyl octyl ketone, phenyl undecyl ketone, phenyl tridecyl ketone, phenyl pentadecyl ketone, and phenyl heptadedyl ketone.

Examples of aliphatic acid amides, which are preferred among the acid amides usable as component (d), include hexaneamide, heptaneamide, octaneamide, nonaneamide, decaneamide, undecaneamide, laurylamide, tridecylamide, myristylamide, palmitylamide, stearylamide, docosylamide, tricosylamide, hexacosylamide, and octacosylamide.

Examples of the hydrocarbons include eicosane, heneicosane, docosane, tricosane, tetracosane, pentacosane, hexacosane, heptacosane, octacosane, nonacosane, triacontane, hentriacontane, dotriacontane, tritriacontane, tetratriacontane, pentatriacontane, hexatriacontane, heptatriacontane, octatriacontane, nonatriacontane, tetracontane, 1-docosene, 1-tricosene, 1-tetracosene, 1-pentacosene, 1-hexacosene, 1-heptacosene, 1-octacosene, 1-nonacosene, and 1-triacontene.

Examples of saturated fatty acids, which are preferred among the fatty acids usable as component (d), include tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid, hentriacontanoic acid, dotriacontanoic acid, tetratriacontanoic acid, hexatriacontanoic acid, and octatriacontanoic acid.

The color change temperature regulator (d) is incorporated in an amount of generally from 0.01 to 0.3 part by weight, preferably from 0.01 to 0.2 part by weight, per part by weight of component (c).

In case where the amount of component (d) is smaller than 0.01 part by weight, the desired effect of regulating color change temperature is difficult to produce. In case where the amount thereof exceeds 0.3 part by weight, the composition is apt to have impaired thermochromic sensitivity and less apt to show a distinct color change.

Examples of the electron-donating chromatic organic compound (a) include conventionally known compounds such as diphenylmethane phthalide derivatives, phenylindolylphthalide derivatives, indolylphthalide derivatives, diphenylmethane azaphthalide derivatives, phenylindolylazaphthalide derivatives, fluoran derivatives, styrynoquinoline derivatives, and diaza-Rhodamine lactone derivatives. Specific examples of these compounds are as follows.

3,3-Bis(p-dimethylaminophenyl)-6-dimethylaminophthalide, 3-(4-diethylaminophenyl)-3-(1-ethyl-2-methylindol-3-yl) phthalide, 3,3-bis(1-n-butyl-2-methylindol-3-yl)phthalide, 3,3-bis(2-ethoxy-4-diethylaminophenyl)-4-azaphthalide, 3-[2-ethoxy-4-(N-ethylanilino)phenyl]-3-(1-ethyl-2-meth ylindol-3-yl)-4-azaphthalide, 3,6-dimethoxyfluoran, 3,6-di-n-butoxyfluoran, 2-methyl-6-(N-ethyl-N-p-tolylamino)fluoran, 3-chloro-6-cyclohexylaminofluoran, 2-methyl-6-cyclohexylaminofluoran, 2-(2-chloroanilino)-6-di-n-butylaminofluoran, 2-(3-trifluoromethylanilino)-6-diethylaminofluoran, 2-(N-methylanilino)-6-(N-ethyl-N-p-tolylamino)fluoran, 1,3-dimethyl-6-diethylaminofluoran, 2-chloro-3-methyl-6-diethylaminofluoran, 2-anilino-3-methyl-6-diethylaminofluoran, 2-anilino-3-methyl-6-di-n-butylaminofluoran, 2-xylidino-3-methyl-6-diethylaminofluoran, 1,2-benzo-6-diethylaminofluoran, 1,2-benzo-6-(N-ethyl-N-isobutylamino)fluoran, 1,2-benzo-6-(N-ethyl-N-isoamylamino) fluoran, 2-(3-methoxy-4-dodecoxystyryl)quinoline, spiro[5H-(1) benzopyrano(2,3-d)pyrimidine-, 5,1'(3'H)isobenzofuran]-3'-one, 2-(diethylamino)-8-(diethylamino)-4-methyl-, spiro[5H-(1)benzopyrano(2,3-d)pyrimidine-, 5,1'(3'H)isobenzofuran]-3'-one, 2-(di-n-butylamino)-8-(di-n-butylamino)-4-methyl-, spiro[5H-(1)benzopyrano(2,3-d)pyrimidine-, 5,1'(3'H)isobenzofuran]-3'-one, 2-(di-n-butylamino)-8-(diethylamino)-4-methyl-, spiro [5H-(1)benzopyrano(2,3-d)pyrimidine-, 5,1'(3'H)isobenzofuran]-3'-one, 2-(di-n-butylamino)-8-(N-ethyl-N-isoamylamino)-4-methyl-, and spiro[5H-(1)benzopyrano(2,3-d)pyrimidine-, 5,1'(3'H)isobenzofuran]-3'-one, 2-(di-n-butylamino)-8-(di-n-butylamino)-4-phenyl.

Examples of component (a) further include pyridine, quinazoline, and bisquinazoline compounds, which are effective in developing a fluorescent, yellow to red color.

Examples of the electron-accepting compound of component (b) include compounds having at least one active proton, pseudo-acid compounds (compounds which are not acids and function as an acid in the composition to cause component (a) to develop a color), and compounds having an electron hole.

Examples of the compounds having at least one active proton include compounds having one or more phenolic hydroxyl groups. Examples thereof include monophenols and polyphenols, mono- or polyphenols substituted with one or more substituents selected from alkyl, aryl, acyl, alkoxycarbonyl, and carboxyl groups, esters or amides of these groups, and halogens, and phenol-aldehyde condensation resins derived from bisphenols, trisphenols, etc. Examples thereof further include metal salts of these compounds having one or more phenolic hydroxyl groups.

Specific examples of such compounds include phenol, o-cresol, t-butylcatechol, nonylphenol, n-octylphenol, n-dodecylphenol, n-stearylphenol, p-chlorophenol, p-bromophenol, o-phenylphenol, 4-(4-(1-methylethoxyphenyl)sulfonylphenol, 4-(4-butyloxyphenyl) sulfonylphenol, 4-(4-pentyloxyphenyl)sulfonylphenol, 4-(4-hexyloxyphenyl)sulfonylphenol, 4-(4-heptyloxyphenyl) sulfonylphenol, 4-(4-octyloxyphenyl) sulfonylphenol, n-butyl p-hydroxybenzoate, n-octyl p-hydroxybenzoate, resorcinol, dodecyl gallate, 2,2-bis(4-hydroxyphenyl) propane, 4,4-dihydroxydiphenyl sulfone, 1,1-bis(4-hydroxyphenyl)ethane, 2,2-bis(4-hydroxy-3-methylphenyl) propane, bis(4-hydroxyphenyl) sulfide, 1-phenyl-1,1-bis(4-hydroxyphenyl)ethane, 1,1-bis(4-hydroxyphenyl)-3-methylbutane, 1,1-bis(4-hydroxyphenyl)-2-methylpropane, 1,1-bis(4-hydroxyphenyl)-n-hexane, 1,1-bis(4-hydroxyphenyl)-n-heptane, 1,1-bis(4-hydroxyphenyl)-n-octane, 1,1-bis(4-hydroxyphenyl)-n-nonane, 1,1-bis(4-hydroxyphenyl)-n-decane, 1,1-bis(4-hydroxyphenyl)-n-dodecane, 1,2-bis(4-hydroxyphenyl)butane, 2,2-bis(4-hydroxyphenyl)ethyl propionate, 2,2-bis(4-hydroxyphenyl)-4-methylpentane, 2,12-bis(4-hydroxypheny ) hexafluoropropane, 2,2-bis(4-hydroxyphenyl)-n-heptane, and 2,2-bis(4-hydroxyphenyl)-n-nonane.

Such compounds having one or more phenolic hydroxyl groups can impart the most effective thermochromic properties However, component (b) may be a compound selected from metal salts of such hydroxyl compounds, aromatic carboxylic acids, aliphatic carboxylic acids having 2 to 5 carbon atoms, metal salts of such aromatic and aliphatic acids, carboxylic acid metal salts, acid phosphoric esters and metal salts thereof, and 1,2,3-triazole and derivatives thereof.

Examples of component (b) further include fluoroalcohol compounds. Specific examples thereof include 2-hydroxyhexafluoroisopropylbenzene, 1,3-bis(2-hydroxyhexafluoroisopropyl)benzene, 1,4-bis(2-hydroxyhexafluoroisopropyl)benzene, 1,3-bis(2-hydroxymethylhexafluoroisopropyl)benzene, 1,3-bis(3-hydroxyl-1,1-bistrifluoromethylpropyl) benzene, 1,4-bis(2-hydroxymethylhexafluoroisopropyl)benzene, 1,4-bis(3-hydroxy-1,1-bistrifluoromethylpropyl)benzene, 2-hydroxymethylhexafluoroisopropylbenzene, and 3-hydroxy-1,1-bistrifluoromethylpropylbenzene.

Even a composition consisting of component (a) and component (b) both for use in the thermochromic composition of the invention can have thermochromic properties. This two-component composition, however, is limited in the regulation of color change temperature. The use of component (c) enables the regulation of color change temperature to be conducted practically.

Component (c) is a compound serving as a reaction medium in which the electron donating/accepting reactions between components (a) and (b) reversibly take place in a specific temperature range. All of conventionally used general reaction media such as, e.g., sulfides, ethers, ketones, esters, alcohols, and acid amides are effective as component (c). Component (c) may be a semiliquid substance such as a medium-molecular weight polymer. Such compounds can be used alone or in combination of two or more thereof. In the case where such compounds are subjected to microencapsulation and secondary processing, low-molecular weight compounds vaporize off the microcapsules in a high-temperature treatment. Consequently, effective compounds which can be stably held in the capsules are those having 10 or more carbon atoms.

Examples of the sulfides include di-n-octyl sulfide, di-n-nonyl sulfide, di-n-decyl sulfide, di-n-dodecyl sulfide, di-n-tetradecyl sulfide, di-n-hexadecyl sulfide, di-n-octadecyl sulfide, octyl dodecyl sulfide, diphenyl sulfide, dibenzyl sulfide, ditolyl sulfide, diethylphenyl sulfide, dinaphthyl sulfide, 4,4'-dichlorodiphenyl sulfide, and 2,4,5,4'-tetrachlorodiphenyl sulfide.

Examples of the ethers include aliphatic ethers having 10 or more carbon atoms, such as dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether; alicyclic ethers such as s-trioxane; and aromatic ethers such as phenylether, benzyl phenyl ether, dibenzyl ether, di-p-tolyl ether, 1-methoxynaphthalene, and 3,4,5-trimethoxytoluene.

Examples of the ketones include aliphatic ketones having 10 or more carbon atoms, such as 2-decanone, 3-decanone, 4-decanone, 2-undecanone, 3-undecanone, 4-undecanone, 5-undecanone, 6-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone;

aryl alkyl ketones having 12 to 24 carbon atoms, such as n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 5 4-tert-butylpropiophenone, n-heptaphenone, 4-n-pentylacetophenone, cyclohexyl phenyl ketone, benzyl n-butyl ketone, 4-n-butylacetophenone, n-hexanophenone, 4-isobutylacetophenone, 1-acetonaphthone, 2-acetonaphthone, and cyclopentyl phenyl ketone;

aryl aryl ketones such as benzophenone, benzyl phenyl ketone, and dibenzyl ketone; and alicyclic ketones such as cyclooctanone, cyclodddecanone, cyclopentadecanone, and 4-tert-butylcyclohexanone.

Effective as the esters are ones having 10 or more carbon atoms. Examples thereof include esters obtained from any combination of a monocarboxylic acid having an aliphatic group or an alicyclic or aromatic ring with a monohydric alcohol having an aliphatic group or an alicyclic or aromatic ring, esters obtained from any combination of a polycarboxylic acid having an aliphatic group or an alicyclic or aromatic ring with a monohydric alcohol having an aliphatic group or an alicyclic or aromatic ring, and esters obtained from any combination of a monocarboxylic acid having an aliphatic group or an alicyclic or aromatic ring with a polyhydric alcohol having an aliphatic group or an alicyclic or aromatic ring. Specific examples thereof include ethyl caprylate, octyl caprylate, stearyl caprylate, myristyl caprate, stearyl caprate, docosyl caprate, 2-ethylhexyl laurate, n-decyl laurate, 3-methylbutyl myristate, cetyl myristate, isopropyl palmitate, neopentyl palmitate, nonyl palmitate, cyclohexyl palmitate, n-butyl stearate, 2-methylbutyl stearate, 3,5,5-trimethylhexyl stearate, n-undecyl stearate, pentadecyl stearate, stearyl stearate, cyclohexylmethyl stearate, isopropyl behenate, hexyl behenate, lauryl behenate, behenyl behenate, cetyl benzoate, stearyl p-tert-butylbenzoate, dimyristyl phthalate, distearyl phthalate, dimyristyl oxalate, dicetyl oxalate, dicetyl malonate, dilauryl succinate, dilauryl glutarate, diundecyl adipate, dilauryl azelate, di-n-nonyl sebacate, dineopentyl 1,18-octadecylmethylenedicarboxylate, ethylene glycol dimyristate, propylene glycol dilaurate, propylene glycol distearate, hexylene glycol dipalmitate, 1,5-pentanediol dimyristate, 1,2,6-hexanetriol trimyristate, 1,4-cyclohexanediol didecanoate, 1,4-cyclohexanedimethanol dimyristate, xylene glycol dicaprate, and xylene glycol distearate.

Also effective is an ester compound selected from esters of a saturated fatty acid with a branched aliphatic alcohol, esters of an unsaturated fatty acid or a saturated fatty acid having one or more branches or substituents with an aliphatic alcohol having one or more branches or 16 or more carbon atoms, cetyl butyrate, stearyl butyrate, and behenyl butyrate.

Specific examples thereof include 2-ethylhexyl butyrate, 2-ethylhexyl behenate, 2-ethylhexyl myristate, 2-ethylhexyl caprate, 3,5,5-trimethylhexyl laurate, 3,5,5-trimethylhexyl palmitate, 3,5,5-trimethylhexyl stearate, 2-methylbutyl caproate, 2-methylbutyl caprylate, 2-methylbutyl caprate, 1-ethylpropyl palmitate, 1-ethylpropyl stearate, 1-ethylpropyl behenate, 1-ethylhexyl laurate, 1-ethylhexyl myristate, 1-ethylhexyl palmitate, 2-methylpentyl caproate, 2-methylpentyl caprylate, 2-methylpentyl caprate, 2-methylpentyl laurate, 2-methylbutyl stearate, 2-methylbutyl stearate, 3-methylbutyl stearate, 2-methylheptyl stearate, 2-methylbutyl behenate, 3-methylbutyl behenate, 1-methylheptyl stearate, 1-methylheptyl behenate, 1-ethylpentyl caproate, 1-ethylpentyl palmitate, 1-methylpropyl stearate, 1-methyloctyl stearate, 1-methylhexyl stearate, 1,1-dimethylpropyl laurate, 1-methylpentyl caprate, 2-methylhexyl palmitate, 2-methylhexyl stearate, 2-methylhexyl behenate, 3,7-dimethyloctyl laurate, 3,7-dimethyloctyl myristate, 3,7-dimethyloctyl palmitate, 3,7-dimethyloctyl stearate, 3,7-dimethyloctyl behenate, stearyl oleate, behenyl oleate, stearyl linoleate, behenyl linoleate, 3,7-dimethyloctyl erucate, stearyl erucate, isostearyl erucate, cetyl isostearate, stearyl isostearate, 2-methylpentyl 12-hydroxystearate, 2-ethylhexyl 18-bromostearate, isostearyl 2-ketomyristate, 2-ethylhexyl 2-fluoromyristate, cetyl butyrate, stearyl butyrate, and behenyl butyrate.

Examples of the alcohols include monohydric aliphatic saturated alcohols such as decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, and docosyl alcohol; aliphatic unsaturated alcohols such as allyl alcohol and oleyl alcohol;

alicyclic alcohols such as cyclopentanol, cyclohexanol, cyclooctanol, cyclododecanol, and 4-tert-butylcyclohexanol; aromatic alcohols such as 4-methylbenzyl alcohol and benzhydrol; and polyhydric alcohols such as polyethylene glycol.

Examples of the acid amides include the following compounds.

Acetamide, propionamide, butyramide, capronamide, caprylamide, capric amide, lauramide, myristamide, palmitamide, stearamide, behenamide, oleamide, erucamide, benzamide, capronanilide, caprylanilide, capric anilide, lauranilide, myristanilide, palmitanilide, stearanilide, behenanilide, oleanilide, erucanilide, N-methylcapronamide, N-methylcaprylamide, N-methyl (capric amide), N-methyllauramide, N-methylmyristamide, N-methylpalmitamide, N-methylstearamide, N-methylbehenamide, N-methyloleamide, N-methylerucamide, N-ethyllauramide, N-ethylmyristamide, N-ethylpalmitamide, N-ethylstearamide, N-ethyloleamide, N-butyllauramide, N-butylmyristamide, N-butylpalmitamide, N-butylstearamide, N-butyloleamide, N-octyllauramide, N-octylmyristamide, N-octylpalmitamide, N-octylstearamide, N-octyloleamide, N-dodecyllauramide, N-dodecylmyristamide, N-dodecylpalmitamide, N-dodecylstearamide, N-dodecyloleamide, dilauroylamine, dimyristoylamine, dipalmitoylamine, distearoylamine, dioleoylamine, trilauroylamine, trimyristoylamine, tripalmitoylamine, tristearoylamine, trioleoylamine, succinamide, adipamide, glutaramide, malonamide, azelamide, maleamide, N-methylsuccinamide, N-methyladipamide, N-methylglutaramide, N-methylmalonamide, N-methylazelamide, N-ethylsuccinamide, N-ethyladipamide, N-ethylglutaramide, N-ethylmalonamide, N-ethylazelamide, N-butylsuccinamide, N-butyladipamide, N-butylglutaramide, N-butylmalonamide, N-octyladipamide, and N-dodecyladipamide.

According to another aspect of the invention, four essential components are microencapsulated which consist of (a) an electron-donating chromatic organic compound, (b) an electron-accepting compound, (c) a reaction medium determining the temperatures at which the color reactions of component (a) with component (b) take place, and (d) one or more compounds selected from ethers, esters, ketones, and acid amides and having a melting point Y (° C.) satisfying the relationship $(X+16)°\ \text{C}. \leq Y \leq (X+100)°\ \text{C}.$, wherein X (° C.) is the melting point of component (c). This pigment gives a temperature-color density curve showing that the pigment undergoes color changes with a hysteresis range ($\Delta H$) having a width of from 5° C. to 80° C., and the colors thereof respectively in a range of temperatures not higher than the lower trigger temperature and in a range of temperatures not lower than the higher trigger temperature are alternately memorized and retained by the pigment in the temperature range between the lower trigger temperature and the higher trigger temperature. In this thermochromic microencapsulated pigment, lower-temperature side color change points can be regulated so as to shift toward the higher-temperature side.

According to still another aspect of the invention, four essential components are microencapsulated which consist of the components (a), (b), and (c) described above and, as component (d), one or more compounds selected from ethers and esters and having a melting point Y (° C.) satisfying the relationship $(X-10)°\ \text{C}. \leq Y \leq (X+15)°\ \text{C}.$, wherein X (° C.) is the melting point of component (c). This pigment gives a temperature-color density curve showing that the pigment undergoes color changes with a hysteresis range ($\Delta H$) having a width of from 5° C. to 80° C., and the colors thereof respectively in a range of temperatures not higher than the lower trigger temperature and in a range of temperatures not lower than the higher trigger temperature are alternately memorized and retained by the pigment in isthe temperature range between the lower trigger temperature and the higher trigger temperature. In this thermochromic microencapsulated pigment, by the incorporation of component (d), higher-temperature-side color change points can be regulated so as to shift toward the lower-temperature side.

A supplementary explanation on these points is given below. The incorporation of component (d) having a melting point Y (° C.) satisfying the relationship $(X+16)°\ \text{C}. \leq Y \leq (X+100)°\ \text{C}.$ shifts $T_1$ (complete-coloration temperature) and $T_2$ (coloration initiation temperature) toward the higher-temperature side as shown by the broken line in the color density-temperature curve given in FIG. 2.

Figure 4:
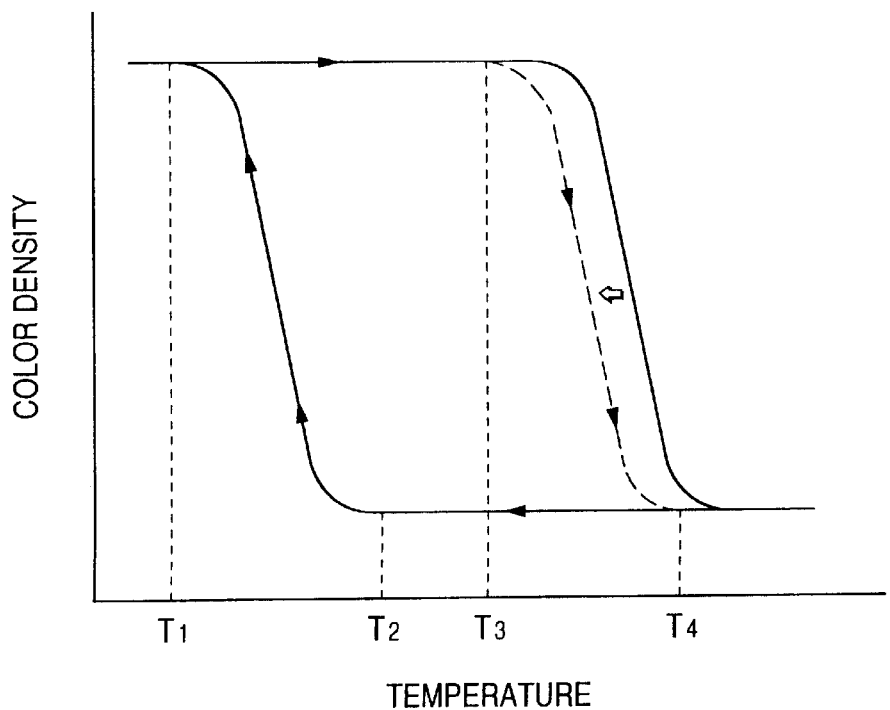
FIG. 4 is a presentation showing a temperature-color density curve of a thermochromic microencapsulated pigment of the invention in which higher-temperature-side color change points of a conventional thermochromic microencapsulated pigment have been shifted toward the lower-temperature side, in which $T_1$ indicates complete-coloration temperature, $T_2$ coloration initiation temperature, $T_3$ decoloration initiation temperature, $T_4$ complete-decoloration temperature, $T_H$ temperature corresponding to the midpoint in color density during coloration, $T_G$ temperature corresponding to the midpoint in color density during decoloration, and $\Delta H$ hysteresis range ($T_G-T_H$)

On the other hand, the incorporation of component (d) having a melting point Y (° C.) satisfying the relationship $(X-10)°\ \text{C}. \leq Y \leq (X+15)°\ \text{C}.$ shifts $T_3$ (decoloration initiation temperature) and $T_4$ (complete-decoloration temperature) toward the lower-temperature side as shown by the broken line in the color density-temperature curve given in FIG. 4.

The temperatures to which either $T_1$ and $T_2$ or $T_3$ and $T_4$ are shifted can be regulated to any desired values by changing the kind and addition amount of component (d), i.e., the color change temperature regulator.

Examples of the ethers usable as component (d) include didodecyl ether, ditridecyl ether, ditetradecyl ether, dipentadecyl ether, dihexadecyl ether, dioctadecyl ether, dinonadecyl ether, dieicosyl ether, and didocosyl ether.

Examples of the esters include lauryl caprate, cetyl caprate, stearyl caprate, docosyl caprate, lauryl laurate, myristyl laurate, stearyl laurate, docosyl laurate, decyl myristate, lauryl myristate, myristyl myristate, stearyl myristate, decyl palmitate, lauryl palmitate, myristyl palmitate, palmityl palmitate, stearyl palmitate, docosyl palmitate, methyl stearate, ethyl stearate, n-propyl stearate, n-butyl stearate, n-octyl stearate, n-decyl stearate, lauryl stearate, myristyl stearate, palmityl stearate, stearyl stearate, docosyl stearate, n-butyl eicosanate, methyl behenate, n-propyl behenate, n-butyl behenate, isoamyl behenate, stearyl behenate, docosyl behenate, dimyristyl malonate, dipalmityl malonate, distearyl malonate, dilauryl succinate, dimyristyl succinate, dipalmityl succinate, distearyl succinate, dilauryl glutarate, dimyristyl glutarate, dipalmityl glutarate, distearyl glutarate, dilauryl adipate, dimyristyl adipate, distearyl adipate, dilauryl suberate, dimyristyl suberate, dipalmityl suberate, distearyl suberate, dilauryl azelate, dimyristyl azelate, dipalmityl azelate, distearyl azelate, dilauryl sebacate, dimyristyl sebacate, dipalmityl sebacate, distearyl sebacate, 1,10-decanedilauryl, 1,10-decanedimyristyl, 1,10-dodecanedicetyl, 1,10-decanedistearyl, 1,10-decanedieicosyl, 1,10-decanedidocosyl, 1,12-dodecanedilauryl, 1,12-dodecanedimyristyl, 1,12-dodecanedicetyl, 1,12-dodecanedistearyl, 1,12-dodecanedieicosyl, 1,12-dodecanedidocosyl, 1,14-tetradecanedilauryl, 1,14-tetradecanedimyristyl, 1,14-tetradecanedicetyl, 1,14-tetradecanedistearyl, 1,14-tetradecanedieicosyl, 1,14-tetradecanedidocosyl, 1,16-hexadecanedilauryl, 1,16-hexadecanedimyristyl, 1,16-hexadecanedicetyl, 1,16-hexadecanedistearyl, 1,16-hexadecanedieicosyl, 1,16-hexadecanedidocosyl, 1,18-octadecanedilauryl, 1,18- octadecanedimyristyl, 1,18-octadecanedicetyl, 1,18-octadecanedistearyl, 1,18-octadecanedieicosyl, 1,18-octadecanedidocosyl, trimyristin, tripalmitin, tristearin, and trinonadecanoin.

Examples of the ketones include dioctyl ketone, dinonyl ketone, diundecyl ketone, ditridecyl ketone, dipentadecyl ketone, diheptadecyl ketone, phenyl tridecyl ketone, phenyl pentadecyl ketone, and phenyl heptadecyl ketone.

Further, as the fatty acids, the above-described saturated fatty acids are also preferably used.

Examples of the acid amides include hexylamide, heptylamide, octylamide, nonylamide, decylamide, undecylamide, laurylamide, tridecylamide, myristylamide, palmitylamide, stearylamide, and docosylamide.

The color change temperature regulators (d) each is incorporated in an amount of generally from 0.01 to 0.3 part by weight, preferably from 0.01 to 0.15 part by weight, per part by weight of component (c).

In case where the amount of component (d) is smaller than 0.01 part by weight, the desired effect of regulating color change temperature is difficult to produce. In case where the amount thereof exceeds 0.3 part by weight, the compositions have too narrow a hysteresis range (ΔH) As a result, a colored state or a decolored state is difficult to be memorized and retained in the temperature range between the lower trigger temperature and the higher trigger temperature.

The electron-donating chromatic organic compound (a) and the electron-accepting compound (b) may be the same as those described hereinabove.

Effective as component (c) are reaction media such as esters and ketones.

Examples of the esters include carboxylic ester compounds having a ΔT [(melting point)-(cloud point)] of from 5° C. to less than 50° C. Specific examples thereof include carboxylic esters containing a substituted aromatic ring in the molecule, esters of a carboxylic acid containing an unsubstituted aromatic ring with an aliphatic alcohol having 10 or more carbon atoms, carboxylic esters containing a cyclohexyl group in the molecule, esters of a fatty acid having 6 or more carbon atoms with an unsubstituted aromatic alcohol or phenol, esters of a fatty acid having 8 or more carbon atoms with a branched aliphatic alcohol, esters of a dicarboxylic acid with an aromatic alcohol or branched aliphatic alcohol, dibenzyl cinnamate, heptyl stearate, didecyl adipate, dilauryl adipate, dimyristyl adipate, dicetyl adipate, distearyl adipate, trilaurin, trimyristin, tristearin, dimyristin, and distearin. Examples thereof further include esters given in JP-A-7-33997 (the term "JP-A" as used herein means an "unexamined published Japanese patent application"), which are fatty acid ester compounds obtained from an aliphatic monohydric alcohol having carbon atoms in an odd number of 9 or larger and an aliphatic carboxylic acid having an even number of carbon atoms and fatty acid ester compounds having 17 to 23 carbon atoms obtained from n-pentyl or n-heptyl alcohol and an aliphatic carboxylic acid having carbon atoms in an even number of 10 to 16. Specific examples of these ester compounds include n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanate, n-undecyl eicosanate, n-tridecyl eicosanate, n-pentadecyl eicosanate, n-nonyl behenate, n-undecyl behenate, n-tridecyl behenate, and n-pentadecyl behenate.

Examples of the ketones include aliphatic ketones having 10 or more carbon atoms, such as 2-decanone, 3-decanone, 4-decanone, 2-undecanone, 3-undecanone, 4-undecanone, 5-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone; and aryl alkyl ketones having 12 to 24 carbon atoms, e.g., phenyl alkyl ketones, such as n-octadecanophenone, n-heptadecanophenone, n-hexadecanophenone, n-pentadecanophenone, n-tetradecanophenone, 4'-n-dodecanoacetophenone, n-tridecanophenone, 4'-n-undecanoacetophenone, n-laurophenone, 4'-n-decanoacetophenone, n-undecanophenone, 4'-n-nonylacetophenone, n-decanophenone, 4'-n-octylacetophenone, n-nonanophenone, 4'-n-heptylacetophenone, n-octanophenone, 4'-n-hexylacetophenone, 4'-n-cyclohexylacetophenone, 4-tert-butylpropiophenone, n-heptanophenone, 4'-n-pentylacetophenone, cyclohexyl phenyl ketone, benzyl n-butyl ketone, 4'-n-butylacetophenone, n-hexanophenone, 4-isobutylacetophenone, 1-acetonaphthone, 2-acetonaphthone, and cyclopentyl phenyl ketone.

By compounding the four essential components consisting of components (a), (b), (c), and (d) described above, a thermochromic composition can be obtained.

The proportions of components (a), (b), and (c) vary depending on the desired color densities, color change temperatures, color change behavior, and kind of each component. However, desirable thermochromic properties are obtained when the amount of component (b) is generally from 0.1 to 50 parts by weight, preferably from 0.5 to 20 parts by weight, and that of component (c) is generally from 1 to 800 parts by weight, preferably from 5 to 200 parts by weight, per part by weight of component (a).

A light stabilizer may be incorporated into the thermochromic compositions in an amount of generally from 0.3 to 24 parts by weight, preferably from 0.8 to 16 parts by weight, per part by weight of the electron-donating chromatic organic compound as component (a), in order to prevent the composition from suffering photodeterioration.

Examples of the light stabilizer include compounds which inhibit oxidation reactions, such as ultraviolet absorbers and antioxidants which prevent the photodeterioration caused by the photoreaction-induced excited state of component (a), singlet oxygen quenchers, e.g., carotenes, pigments, amines, phenols, nickel complexes, and sulfides, superoxide anion quenchers, e.g. complexes of oxide dismutase with cobalt and nickel, and ozone quenchers.

Each of the thermochromic compositions described above is microencapsulated and used as a microencapsulated pigment. Thus, the thermochromic composition can retain the same makeup under various use conditions, and a chemically and physically stable pigment can be constituted. This pigment can produce the same effects as the composition.

For the microencapsulation, conventionally known techniques can be used. Examples thereof include interfacial polymerization, in-situ polymerization, in-liquid curing coating, phase separation from an aqueous solution, phase separation from an organic solvent, melt dispersion cooling, air-suspension coating, and spray drying. A suitable technique is selected according to the intended use. Before the microcapsules are subjected to practical use, the surface thereof may be coated with an additional resin film to thereby impart durability or modify the surface properties according to purposes.

The light stabilizer may be microencapsulated together with the thermochromic composition. Alternatively, the light stabilizer may be added to a vehicle which is used when the microencapsulated composition is used as a colorant. It is also possible to incorporate the light stabilizer into the microcapsules and to simultaneously add the stabilizer to the vehicle.

The thermochromic microencapsulated pigments of the invention can be obtained by microencapsulation techniques which have conventionally been used generally. Dispersing the pigments into various vehicles gives printing inks and coating materials, with which printed matters and coated articles can be obtained. The pigments can also be blended with a molding resin to obtain various molded articles by general molding techniques.

Furthermore, the pigments can be dispersed into a waxy or pasty medium to give a colorant.

The pigments may be suitably used in combination with one or more dyes or pigments which are not thermochromic, whereby a variety of color changes can be obtained.

Embodiments of the invention will be given below, but the invention should not be construed as being limited thereto.

EXAMPLES 1 TO 9 AND COMPARATIVE EXAMPLES 1 TO 8

In Table 1 is shown the composition, with respect to components (a), (b), (c), and (d), of each of the thermochromic microencapsulated pigments of Examples 1 to 9.

In each combination of components (c) and (d), the component (d) is a compound satisfying the relationship $(X+30)°\,C. \leq Y \leq 200°\,C.$, wherein $X$ (° C.) is the melting point of the component (c) The melting points of these two components are also shown in the table, wherein the numeral in each parenthesis indicates the amount in terms of parts by weight.

TABLE 1

| | (a) | (b) | (c) | (d) |
|---|---|---|---|---|
| Ex. 1 | 3-[2-ethoxy-4-(N-ethylanilino)-phenyl]-3-(1-ethyl-2-methylindol-3-yl)-4-azaphthalide (1.5) | 2,2-bis(4-hydroxy-phenyl)hexafluoro-propane (6.0) | neopentyl stearate (50.0) m.p. 36.0° C. | stearyl behenate (1.0) m.p. 69.0° C. |
| Ex. 2 | 3-[2-ethoxy-4-(N-ethylanilino)-phenyl]-3-(1-ethyl-2-methylindol-3-yl)-4-azaphthalide (1.5) | 1,1-bis(4-hydroxy-phenyl)-n-decane (6.0) | stearyl caprate (40.0) cetyl caprate (10.0) m.p. 35.7° C. | palmitylamide (0.5) m.p. 107.0° C. |
| Ex. 3 | 3-[2-ethoxy-4-(N-ethylanilino)-phenyl]-3-(1-ethyl-2-methylindol-3-yl)-4-azaphthalide (1.5) | 1,1-bis(4-hydroxyphenyl)-n-decane (6.0) | stearyl caprate (40.0) cetyl caprate (10.0) m.p. 35.7° C. | tetratriacontane (3.0) m.p. 73.0° C. |
| Ex. 4 | 3-[2-ethoxy-4-(N-ethylanilino)-phenyl]-3-(1-ethyl-2-methylindol-3-yl)-4-azaphthalide (1.5) | 1,1-bis(4-hydroxyphenyl)-n-decane (6.0) | n-butyl stearate (40.0) n-butyl palmitate (10.0) m.p. 25.3° C. | ditridecyl ketone (1.0) m.p. 79.0° C. |
| Ex. 5 | 3-[2-ethoxy-4-(N-ethylanilino)-phenyl]-3-(1-ethyl-2-methylindol-3-yl)-4-azaphthalide (1.5) | 1,1-bis(4-hydroxyphenyl)-n-decane (6.0) | stearyl laurate (25.0) stearyl caprate (25.0) m.p. 39.2° C. | diheptadecyl ketone (3.0) m.p. 89.0° C. |
| Ex. 6 | 1,2-benzo-6-(N-ethyl-N-isobutyl-amino)fluoran (1.5) | 2,2-bis(4-hydroxy-phenyl)hexafluoro-propane (6.0) | n-heptyl stearate (50.0) m.p. 35.0° C. | docosyl behenate (5.0) m.p. 75.5° C. |
| Ex. 7 | 1,2-benzo-6-(N-ethyl-N-isobutyl-amino)fluoran (1.5) | 2,2-bis(4-hydroxy-phenyl)hexafluoro-propane (6.0) | n-heptyl stearate (50.0) m.p. 35.0° C. | behenyl alcohol (3.0) m.p. 70.0° C. |
| Ex. 8 | 3,3-bis(2-ethoxy-4-diethylamino)-4-azaphthalide (1.5) | 2,2-bis(4-hydroxy-phenyl)hexafluoro-propane (6.0) | neopentyl stearate (50.0) m.p. 36.0° C. | diheptadecyl ketone (5.0) m.p. 89.0° C. |
| Ex. 9 | 3-[2-ethoxy-4-(N-ethylanilino)-phenyl]-3-(1-ethyl-2-methylindol-3-yl)-4-azaphthalide (1.5) | 1,1-bis(4-hydroxyphenyl)-n-decane (8.0) | 2-methyl-pentyl behenate (25.0) 2-ethyl-hexyl behenate (25.0) m.p. 35.9° C. | stearylamide (3.0) m.p. 109.0° C. |

Preparation of Microencapsulated Pigment Containing Thermochromic Composition

A thermochromic composition consisting of 1.5 parts by weight of 3-[2-ethoxy-4-(N-ethylanilino)phenyl]-3-(1-ethyl-2-methylindol-3-yl)-4-azaphthalide as component (a), 6.0 parts by weight of 1,1-bis(4-hydroxyphenyl) hexafluoropropane as component (b), 50.0 parts by weight of neopentyl stearate as component (c), and 1.0 part by weight of stearyl behenate as component (d) was homogenized to obtain a solution. Thereto were added 30.0 parts by weight of an aromatic isocyanate prepolymer as a wall material and 35.0 parts by weight of ethyl acetate. This mixture was heated at 70° C. for dissolution. The resultant solution was emulsified in a 15% gelatin solution.

During the emulsification, the mixture was agitated with a homomixer while regulating the stirring power of the mixer so as to result in a particle diameter of from 6.0 to 8.0 μm. After the resultant emulsion was further stirred for about 1 hour, 2.5 parts by weight of a water-soluble modified aliphatic amine was added thereto. Stirring was further continued for 6 hours to obtain a suspension of a thermochromic microencapsulated pigment.

The thermochromic microencapsulated-pigment suspension was subjected to centrifugal separation to isolate the microencapsulated pigment. This microencapsulated pigment showed such thermochromic properties that its color changed between blue and colorless.

Particle Diameter Measurement

The microencapsulated pigment was examined for particle diameter with a laser type particle size distribution analyzer (LA-300, manufactured by Horiba Ltd.). As a result, the average particle diameter of the pigment was found to be 6.0 µm.

Preparation of Sample for Measurement

A thermochromic ink prepared by dispersing 40 parts by weight of the microencapsulated pigment into 60 parts by weight of an ethylene/vinyl acetate copolymer emulsion was used to print a circle of a given size on wood-free paper by screen printing.

Measurement of Color Change Temperatures

The printed matter was set in the proper position in a color-difference meter (Type TC-3600, manufactured by K.K. Tokyo Denshoku), and was heated and cooled at a rate of 10° C./min in a temperature range having a width of 50° C. to measure the color density thereof at each of various temperatures.

In Examples 2 to 9, the compositions shown in Table 1 were used to prepare microencapsulated pigments in the same manner as in Example 1. These microencapsulated pigments were examined for particle diameter and subjected to the sample preparation and the measurement of color change temperatures with the color-difference meter, in the same manners as in Example 1.

In Table 2 are shown the particle diameter, $T_1$ (complete-coloration temperature), $T_2$ (coloration initiation temperature), $T_3$ (decoloration initiation temperature), $T_4$ (complete-decoloration temperature), $T_H$ (temperature corresponding to the midpoint in color density during coloration), $T_G$ (temperature corresponding to the midpoint in color density during decoloration), and ΔH (hysteresis range) of the thermochromic microencapsulated pigment of each Example.

TABLE 2

| | Average particle diameter | $T_1$ (° C.) | $T_H$ (° C.) | $T_2$ (° C.) | $T_3$ (° C.) | $T_G$ (° C.) | $T_4$ (° C.) | ΔH (° C.) |
|---|---|---|---|---|---|---|---|---|
| Ex. 1 | 6.0 µm | 16.0 | 18.0 | 20.0 | 29.0 | 32.5 | 36.0 | 14.5 |
| Ex. 2 | 6.0 µm | 26.0 | 29.5 | 33.0 | 28.0 | 32.0 | 36.0 | 2.5 |
| Ex. 3 | 2.0 µm | 20.0 | 26.0 | 32.0 | 24.0 | 31.0 | 38.0 | 5.0 |
| Ex. 4 | 1.0 µm | 4.0 | 13.0 | 22.0 | 6.0 | 15.0 | 24.0 | 2.0 |
| Ex. 5 | 0.5 µm | 25.0 | 31.0 | 37.0 | 30.0 | 36.0 | 42.0 | 5.0 |
| Ex. 6 | 0.7 µm | 17.0 | 22.0 | 27.0 | 25.0 | 30.0 | 35.0 | 8.0 |
| Ex. 7 | 0.7 µm | 14.0 | 18.0 | 22.0 | 24.0 | 30.0 | 36.0 | 12.0 |
| Ex. 8 | 0.5 µm | 12.0 | 15.0 | 18.0 | 26.0 | 30.5 | 35.0 | 15.5 |
| Ex. 9 | 1.0 µm | 25.0 | 30.5 | 35.5 | 27.0 | 32.5 | 38.0 | 2.0 |

The microencapsulated pigments of Examples 2 to 5 and 9 each changed in color between blue and colorless, the microencapsulated pigments of Examples 6 and 7 each changed between pink and colorless, and the microencapsulated pigment of Example 8 changed between blue-green and colorless.

In Table 3 is shown the composition, with respect to components (a), (b), and (c), of each of the thermochromic microencapsulated pigments of Comparative Examples 1 to 8. The melting point of component (c) is also shown.

The numeral in each parenthesis in the table indicates the amount in terms of parts by weight.

TABLE 3

| | (a) | (b) | (c) |
|---|---|---|---|
| Comp. Ex. 1 | 3-[2-ethoxy-4-(N-ethylanilino)-phenyl]-3-(1-ethyl-2-methylindol-3-yl)-4-azaphthalide (1.5) | 2,2-bis(4-hydroxy-phenyl)hexafluoro-propane (6.0) | neopentyl stearate (50.0) m.p. 36.0° C. |
| Comp. Ex. 2 | 3-[2-ethoxy-4-(N-ethylanilino)-phenyl]-3-(1-ethyl-2-methylindol-3-yl)-4-azaphthalide (1.5) | 1,1-bis(4-hydroxyphenyl)-n-decane (6.0) | stearyl caprate (40.0) cetyl caprate (10.0) m.p. 35.7° C. |
| Comp. Ex. 3 | 3-[2-ethoxy-4-(N-ethylanilino)-phenyl]-3-(1-ethyl-2-methylindol-3-yl)-4-azaphthalide (1.5) | 1,1-bis(4-hydroxyphenyl)-n-decane (6.0) | stearyl caprate (40.0) cetyl caprate (10.0) m.p. 35.7° C. |
| Comp. Ex. 4 | 3-[2-ethoxy-4-(N-ethylanilino)-phenyl]-3-(1-ethyl-2-methylindol-3-yl)-4-azaphthalide (1.5) | 1,1-bis(4-hydroxyphenyl)-n-decane (6.0) | n-butyl stearate (40.0) n-butyl palmitate (10.0) m.p. 25.3° C. |
| Comp. Ex. 5 | 3-[2-ethoxy-4-(N-ethylanilino)-phenyl]-3-(1-ethyl-2-methylindol-3-yl)-4-azaphthalide (1.5) | 1,1-bis(4-hydroxyphenyl)-n-decane (6.0) | stearyl laurate (25.0) stearyl caprate (25.0) m.p. 39.2° C. |
| Comp. Ex. 6 | 1,2-benzo-6-(N-ethyl-N-isobutyl-amino) fluoran (1.5) | 2,2-bis(4-hydroxy-phenyl)hexafluoro-propane (6.0) | n-heptyl stearate (50.0) m.p. 35.0° C. |
| Comp. Ex. 7 | 3,3-bis(2-ethoxy-4-diethylamino)-4-azaphthalide (1.5) | 2,2-bis(4-hydroxy-phenyl)hexafluoro-propane (6.0) | neopentyl stearate (50.0) m.p. 36.0° C. |
| Comp. Ex. 8 | 3-[2-ethoxy-4-(N-ethylanilino)-phenyl]-3-(1-ethyl-2-methylindol-3-yl)-4-azaphthalide (1.5) | 1,1-bis(4-hydroxyphenyl)-n-decane (8.0) | 2-methylpentyl behenate (25.0) 2-ethylhexyl behenate (25.0) m.p. 35.9° C. |

In Table 4 are shown the particle diameter, $T_1$ (complete-coloration temperature), $T_2$ (coloration initiation temperature), $T_3$ (decoloration initiation temperature), $T_4$ (complete-decoloration temperature), $T_H$ (temperature corresponding to the midpoint in color density during coloration), $T_G$ (temperature corresponding to the midpoint in color density during decoloration), and ΔH (hysteresis range) of the thermochromic microencapsulated pigment of each of Comparative Examples 1 and 2.

In the Comparative Examples, microencapsulated pigments were prepared in the same manner as in Example 1. These microencapsulated pigments were examined for particle diameter and subjected to the sample preparation and the measurement of color change temperatures with the color-difference meter, in the same manners as in Example 1.

TABLE 4

| | Average particle diameter | $T_1$ (° C.) | $T_H$ (° C.) | $T_2$ (° C.) | $T_3$ (° C.) | $T_G$ (° C.) | $T_4$ (° C.) | ΔH (° C.) |
|---|---|---|---|---|---|---|---|---|
| Comp. Ex. 1 | 6.0 µm | 13.0 | 14.5 | 16.0 | 29.0 | 32.5 | 36.0 | 18.0 |
| Comp. Ex. 2 | 6.0 µm | 24.0 | 26.5 | 29.0 | 27.0 | 31.0 | 35.0 | 4.5 |

In Table 5 are shown the particle diameter, $T_1$ (complete-coloration temperature), $T_2$ (coloration initiation temperature), $T_3$ (decoloration initiation temperature), and $T_4$ (complete-decoloration temperature) of the thermochromic microencapsulated pigment of each of Comparative Examples 3 to 8.

TABLE 5

| | Average particle diameter | $T_1$ (° C.) | $T_2$ (° C.) | $T_3$ (° C.) | $T_4$ (° C.) |
|---|---|---|---|---|---|
| Comp. Ex. 3 | 1.0 μm | 8.0 | 28.0 | 24.0 | 36.0 |
| Comp. Ex. 4 | 1.0 μm | 6.0 | 17.0 | 8.0 | 24.0 |
| Comp. Ex. 5 | 0.5 μm | 10.0 | 31.0 | 29.0 | 38.0 |
| Comp. Ex. 6 | 0.7 μm | 8.0 | 20.0 | 27.0 | 34.0 |
| Comp. Ex. 7 | 0.5 μm | 2.0 | 14.0 | 26.0 | 36.0 |
| Comp. Ex. 8 | 1.0 μm | 22.0 | 32.0 | 27.0 | 38.0 |

The pigments obtained in the Examples and Comparative Examples given above are explained below with respect to color change temperatures by means of diagrams.

The microencapsulated pigment of Example 1, which contained a thermochromic composition, showed such color change temperatures that it had a hysteresis range (ΔH) narrower by 3.5° C. than the pigment of Comparative Example 1. The pigment of Example 1 showed a color change temperature curve such as that given in FIG. 2.

Likewise, a comparison between Example 2 and Comparative Example 2 shows that the pigment of Example 2 had a hysteresis range (ΔH) narrower by 2.0° C. than that of the pigment of Comparative Example 2. The pigment of Example 2 showed a color change temperature curve such as that given in FIG. 2.

The microencapsulated pigment of Example 3, which contained a thermochromic composition, showed such color change temperatures that it began to color at 32° C. and completely colored at 20° C., in contrast to the thermochromic composition of Comparative Example 3, which not only began to gradually color at 28° C. and completely colored at 8° C. but showed stepwise coloration. Namely, the pigment of Example 3 had color change temperatures shifted to the higher-temperature side, and showed a distinct color change. This pigment showed a color change temperature curve such as that given in FIG. 3.

The microencapsulated pigment of Example 4, which contained a thermochromic composition, showed such color change temperatures that it began to color at 22° C. and completely colored at 4° C., in contrast to the thermochromic composition of Comparative Example 4, which not only began to gradually color at 17° C. and completely colored at 6° C. but showed stepwise coloration. Namely, the pigment of Example 4 had color change temperatures shifted to the higher-temperature side, and showed a distinct color change. This pigment showed a color change temperature curve such as that given in FIG. 3.

The microencapsulated pigment of Example 5, which contained a thermochromic composition, showed such color change temperatures that it began to color at 37° C. and completely colored at 25° C., in contrast to the thermochromic composition of Comparative Example 5, which not only began to gradually color at 31° C. and completely colored at 10° C. but showed stepwise coloration. Namely, the pigment of Example 5 had color change temperatures shifted to the higher-temperature side, and showed a distinct color change. This pigment showed a color change temperature curve such as that given in FIG. 3.

The microencapsulated pigment of Example 6, which contained a thermochromic composition, showed such color change temperatures that it began to color at 27° C. and completely colored at 17° C., in contrast to the thermochromic composition of Comparative Example 6, which not only began to gradually color at 20° C. and completely colored at 8° C. but showed stepwise coloration. Namely, the pigment of Example 6 had color change temperatures shifted to the higher-temperature side, and showed a distinct color change. This pigment showed a color change temperature curve such as that given in FIG. 3.

The microencapsulated pigment of Example 7, which contained a thermochromic composition, showed such color change temperatures that it began to color at 22° C. and completely colored at 14° C., in contrast to the thermochromic composition of Comparative Example 6, which not only began to gradually color at 20° C. and completely colored at 8° C. but showed stepwise coloration. Namely, the pigment of Example 7 had color change temperatures shifted to the higher-temperature side, and showed a distinct color change. This pigment showed a color change temperature curve such as that given in FIG. 3.

The microencapsulated pigment of Example 8, which contained a thermochromic composition, showed such color change temperatures that it began to color at 18° C. and completely colored at 12° C., in contrast to the thermochromic composition of Comparative Example 7, which not only began to gradually color at 14° C. and completely colored at 2° C. but showed stepwise coloration. Namely, the pigment of Example 8 had color change temperatures shifted to the higher-temperature side, and showed a distinct color change. This pigment showed a color change temperature curve such as that given in FIG. 3.

The microencapsulated pigment of Example 9, which contained a thermochromic composition, showed such color change temperatures that it began to color at 35.5° C. and completely colored at 25° C., in contrast to the thermochromic composition of Comparative Example 8, which not only began to gradually color at 32° C. and completely colored at 22° C. but showed stepwise coloration. Namely, the pigment of Example 9 had color change temperatures shifted to the higher-temperature side, and showed a distinct color change. This pigment showed a color change temperature curve such as that given in FIG. 3.

EXAMPLES 10 TO 21 AND COMPARATIVE EXAMPLES 9 TO 16

In Table 6 is shown the composition, with respect to components (a), (b), (c), and (d), of each of the thermochromic microencapsulated pigments of Examples 10 to 20. Each combination of components (c) and (d) satisfies the relationship $(X+16)° C. \leq Y \leq (X+100)° C.$ or $(X-10)° C. \leq Y \leq (X+15)° C.$, wherein $X$ (° C.) and $Y$ (° C.) are the melting points of components (c) and (d), respectively. The melting points of these two components are also shown in the table, wherein the numeral in each parenthesis indicates the amount in terms of parts by weight.

TABLE 6

| | (a) | (b) | (c) | (d) |
|---|---|---|---|---|
| Ex. 10 | 3-cyclo-hexylamino-7-methylfluoran (1.5) | 1,1-bis(4-hydroxy-phenyl)-ethane (6.0) | neopentyl stearate (50.0) m.p. 35.8° C. | stearyl laurate (5.0) m.p. 45.1° C. |

TABLE 6-continued

| | (a) | (b) | (c) | (d) |
|---|---|---|---|---|
| Ex. 11 | 3-cyclo-hexylamino-7-methylfluoran (1.5) | 1,1-bis(4-hydroxy-phenyl)-ethane (6.0) | neopentyl stearate (50.0) m.p. 35.8° C. | stearyl stearate (5.0) m.p. 58.8° C. |
| Ex. 12 | 1,2-benzo-6-(N-ethyl-N-isobutylamino)-fluoran (1.5) | 2,2-bis(4-hydroxy-phenyl)-propane (6.0) | tridecyl laurate (50.0) m.p. 37.2° C. | stearyl stearate (5.0) m.p. 58.8° C. |
| Ex. 13 | 2-(2-chloro-anilino)-6-di-n-butylamino-fluoran (3.0) | 2,2-bis(4-hydroxy-phenyl)-propane (6.0) | n-heptyl stearate (50.0) m.p. 35.0° C. | stearyl caprate (2.5) m.p. 39.2° C. |
| Ex. 14 | 3-[2-ethoxy-4-(N-ethylanilino)-phenyl]-3-(1-ethyl-2-methylindol-3-yl)-4-azaphthalide (1.5) | 2,2-bis(4-hydroxy-phenyl)-propane (6.0) | n-nonyl palmitate (50.0) m.p. 34.0° C. | decyl myristate (1.0) m.p. 25.4° C. |
| Ex. 15 | 3-[2-ethoxy-4-(N-ethylanilino)-phenyl]-3-(1-ethyl-2-methylindol-3-yl)-4-azaphthalide (1.5) | 2,2-bis(4-hydroxy-phenyl)-propane (6.0) | n-nonyl palmitate (50.0) m.p. 34.0° C. | n-dodecyl ether (1.5) m.p. 32.4° C. |
| Ex. 16 | 3-[2-ethoxy-4-(N-ethylanilino)-phenyl]-3-(1-ethyl-2-methylindol-3-yl)-4-azaphthalide (1.5) | 1,1-bis(4-hydroxy-phenyl)-ethane (6.0) | n-nonyl palmitate (50.0) m.p. 34.0° C. | n-octadecyl ether (1.5) m.p. 58.0° C. |
| Ex. 17 | 1,2-benzo-6-(N-ethyl-N-isobutylamino)-fluoran (1.5) | 1,1-bis(4-hydroxy-phenyl)-ethane (6.0) | undecyl laurate (50.0) m.p. 35.1° C. | tetradecyl ether (1.5) m.p. 44.0° C. |
| Ex. 18 | 1,2-benzo-6-(N-ethyl-N-isobutylamino)-fluoran (1.5) | 1,1-bis(4-hydroxy-phenyl)-ethane (6.0) | undecyl myristate (50.0) m.p. 35.3° C. | stearyl laurate (1.5) m.p. 45.1° C. |
| Ex. 19 | 1,2-benzo-6-(N-ethyl-N-isobutylamino)-fluoran (1.5) | 2,2-bis(4-hydroxy-phenyl)-propane (6.0) | n-nonyl palmitate (50.0) m.p. 34.0° C. | stearamide (1.5) m.p. 109.0° C. |
| Ex. 20 | 3-butylamino-6-methyl-7-anilino-fluoran (3.0) | 2,2-bis(4-hydroxy-phenyl)-propane (6.0) | n-laurophenone (50.0) m.p. 46.0° C. | di-n-heptyldecyl ketone (1.5) m.p. 89.0° C. |
| Ex. 21 | 3-cyclo-hexylamino-7-methylfluoran (1.5) | 1,1-bis(4-hydroxy-phenyl)-ethane (6.0) | neopentyl stearate (50.0) m.p. 35.8° C. | eicosanoic acid (1.0) m.p. 76.1° C. |

In table 7 are shown the $T_1$ (complete-coloration temperature) $T_2$ (coloration initiation temperature), $T_3$ decoloration initiation temperature), $T_4$ complete-decoloration temperature), $T_H$ (temperature corresponding to the midpoint in color density during coloration), $T_G$ (temperature corresponding to the midpoint in color density during decoloration), and ΔH (hysteresis range) the thermochromic microencapsulated pigment of each Example.

TABLE 7

| | $T_1$ (° C.) | $T_H$ (° C.) | $T_2$ (° C.) | $T_3$ (° C.) | $T_G$ (° C.) | $T_4$ (° C.) | ΔH (° C.) |
|---|---|---|---|---|---|---|---|
| Ex. 10 | 14.0 | 15.5C | 17.0 | 29.0 | 31.5 | 34.0 | 16.0 |
| Ex. 11 | 19.0 | 20.5 | 22.0 | 31.0 | 33.5 | 36.0 | 13.0 |
| Ex. 12 | 23.0 | 25.5 | 28.0 | 27.0 | 31.0 | 35.0 | 5.5 |
| Ex. 13 | 20.5 | 21.5 | 23.0 | 26.0 | 30.0 | 34.0 | 8.5 |
| Ex. 14 | 17.0 | 18.5 | 20.0 | 27.0 | 30.0 | 33.0 | 11.5 |
| Ex. 15 | 17.0 | 18.5 | 20.0 | 26.0 | 30.0 | 34.0 | 11.5 |
| Ex. 16 | 22.0 | 25.5 | 29.0 | 29.0 | 32.0 | 35.0 | 6.5 |
| Ex. 17 | 6.0 | 9.5 | 13.0 | 26.0 | 28.0 | 30.0 | 18.5 |
| Ex. 18 | 16.0 | 17.5 | 19.0 | 27.0 | 29.0 | 31.0 | 11.5 |
| Ex. 19 | 24.0 | 26.0 | 28.0 | 29.0 | 32.0 | 35.0 | 6.0 |
| Ex. 20 | 1.0 | 5.0 | 10.0 | 35.0 | 40.5 | 46.0 | 35.0 |
| Ex. 21 | 18.5 | 19.0 | 21.0 | 31.0 | 33.5 | 36.0 | 14.5 |

Preparation of Microencapsulated Pigment Containing Therrmochromic Composition

A mixture of 1.5 parts by weight of 3-cyclohexylamino-7-methylfluoran as component (a), 6.0 parts by weight of 1,1-bis(4-hydroxyphenyl)ethane as component (b), 50.0 parts by weight of neopentyl stearate as component (c), and 5.0 parts by weight of stearyl laurate as component (d) was heated at 120° C. to obtain a homogeneous solution. Thereafter, this solution was microencapsulated with an epoxy resin film formed from an epoxy resin and an amine hardener by interfacial polymerization to prepare a microencapsulated pigment. This microencapsulated pigment showed such thermochromic properties that its color changed between orange and colorless.

Preparation of Sample for Measurement

A thermochromic ink prepared by dispersing 40 parts by weight of the microencapsulated pigment into 60 parts by weight of an ethylene/vinyl acetate copolymer emulsion was used to print a circle of a given size on wood-free paper by screen printing.

Measurement of Color Change Temperatures

The printed matter was set in the proper position in a color-difference meter (Type TC-3600, manufactured by K.K. Tokyo Denshoku), and was heated and cooled at a rate of 10° C./min in a temperature range having a width of 50° C. to measure the color density thereof at each of various temperatures.

In Examples 10 to 21, the compositions shown in Table 6 were used to prepare microencapsulated pigments in the same manner as in Example 10. These microencapsulated pigments were subjected to the sample preparation and the measurement of color change temperatures with the color-difference meter, in the same manners as in Example 10.

The pigments obtained in some of Examples 10 to 21 showed the following thermochromic properties. The microencapsulated pigment of Example 12 changed in color between pink and colorless; the microencapsulated pigment of Example 13 changed between black and colorless; the microencapsulated pigment of Example 14 changed between blue and colorless; the microencapsulated pigment of Example 17 changed between pink and colorless; and the microencapsulated pigment of Example 20 changed between pink and colorless.

In Table 8 is shown the composition, with respect to components (a), (b), and (c), of each of the thermochromic microencapsulated pigments of Comparative Examples 9 to 16. The melting point of component (c) is also shown.

The numeral in each parenthesis in the table indicates the amount in terms of parts by weight.

TABLE 8

|  | (a) | (b) | (c) |
|---|---|---|---|
| Comp. Ex. 9 | 3-cyclohexylamino-7-methylfluoran (1.5) | 1,1-bis(4-hydroxyphenyl)-ethane (6.0) | neopentyl stearate (50.0) m.p. 35.8° C. |
| Comp. Ex. 10 | 1,2-benzo-6-(N-ethyl-N-isobutylamino)-fluoran (1.5) | 2,2-bis(4-hydroxyphenyl)-propane (6.0) | tridecyl laurate (50.0) m.p. 37.2° C. |
| Comp. Ex. 11 | 2-(2-chloroanilino)-6-di-n-butylamino-fluoran (3.0) | 2,2-bis(4-hydroxyphenyl)-propane (6.0) | n-heptyl stearate (50.0) m.p. 35.0° C. |
| Comp. Ex. 12 | 3-[2-ethoxy-4-(N-ethylanilino)-phenyl]-3-(1-ethyl-2-methylindol-3-yl)-4-azaphthalide (1.5) | 2,2-bis(4-hydroxyphenyl)-propane (6.0) | n-nonyl palmitate (50.0) m.p. 34.0° C. |
| Comp. Ex. 13 | 3,3-bis(2-ethoxy-4-diethylaminophenyl)-4-azaphthalide (1.0) | 1,1-bis(4-hydroxyphenyl)-ethane (6.0) | undecyl laurate (50. 0) m.p. 35.1° C. |
| Comp. Ex. 14 | 3,3-bis(2-ethoxy-4-diethylaminophenyl)-4-azaphthalide (1.0) | 1,1-bis(4-hydroxyphenyl)-ethane (6.0) | undecyl myristate (50.0) m.p. 35.3° C. |
| Comp. Ex. 15 | 1,2-benzo-6-(N-ethyl-N-isobutylamino)-fluoran (1.5) | 2,2-bis(4-hydroxyphenyl)-propane (6.0) | n-nonyl palmitate (50.0) m.p. 34.0° C. |
| Comp. Ex. 16 | 3-butylamino-6-methyl-7-anilino-fluoran (3.0) | 2,2-bis(4-hydroxyphenyl)-propane (6.0) | n-laurophenone (50.0) m.p. 46.0° C. |

In Table 9 are shown the $T_1$ (complete-coloration temperature) $T_2$ (coloration initiation temperature), $T_3$ (decoloration initiation temperature), $T_4$ (complete-decoloration temperature), $T_H$ (temperature corresponding to the midpoint in color density during coloration), $T_G$ (temperature corresponding to the midpoint in color density during decoloration), and $\Delta H$ (hysteresis range) of the thermochromic microencapsulated pigment of each of the Comparative Examples.

In the Comparative Examples, microencapsulated pigments were prepared in the same manner as in Example 1. These microencapsulated pigments were subjected to the sample preparation and the measurement of color change temperatures with the color-difference meter, in the same manners as in Example 1.

TABLE 9

| | $T_1$ (° C.) | $T_H$ (° C.) | $T_2$ (° C.) | $T_3$ (° C.) | $T_G$ (° C.) | $T_4$ (° C.) | $\Delta H$ (° C.) |
|---|---|---|---|---|---|---|---|
| Comp. Ex. 9 | 14.0 | 15.5C | 17.0 | 31.0 | 33.5 | 36.0 | 18.0 |
| Comp. Ex. 10 | 18.0 | 20.5 | 23.0 | 27.0 | 31.0 | 35.0 | 10.5 |
| Comp. Ex. 11 | 20.5 | 21.5 | 23.0 | 31.0 | 33.0 | 35.0 | 11.5 |
| Comp. Ex. 12 | 17.0 | 18.5 | 20.0 | 29.0 | 32.0 | 35.0 | 13.5 |
| Comp. Ex. 13 | 6.0 | 9.5 | 13.0 | 29.0 | 31.0 | 33.0 | 21.5 |
| Comp. Ex. 14 | 16.0 | 17.5 | 19.0 | 30.0 | 32.0 | 34.0 | 14.5 |
| Comp. Ex. 15 | 17.0 | 18.5 | 20.0 | 29.0 | 32.0 | 35.0 | 13.5 |
| Comp. Ex. 16 | −6.0 | 0.0 | 4.0 | 35.0 | 40.5 | 46.0 | 40.5 |

The pigments obtained in the Examples and Comparative Examples given above are explained below with respect to color change temperatures by means of diagrams.

The microencapsulated pigment of Example 10, which contained a thermochromic composition, showed such color change temperatures that it had a hysteresis range ($\Delta H$) narrower by 2° C. than the pigment of Comparative Example 9. The pigment of Example 10 showed a color change temperature curve such as that given in FIG. 4.

Likewise, a comparison between Example 11 and Comparative Example 9 shows that the pigment of Example 11 had a hysteresis range ($\Delta H$) narrower by 5° C. than that of the pigment of Comparative Example 9. The pigment of Example 11 showed a color change temperature curve such as that given in FIG. 2.

Likewise, a comparison between Example 12 and Comparative Example 10 shows that the pigment of Example 12 had a hysteresis range ($\Delta H$) narrower by 5.0° C. than that of the pigment of Comparative Example 10. The pigment of Example 12 showed a color change temperature curve such as that given in FIG. 2.

Likewise, a comparison between Example 13 and Comparative Example 11 shows that the pigment of Example 13 had a hysteresis range ($\Delta H$) narrower by 3.0° C. than that of the pigment of Comparative Example 11. The pigment of Example 13 showed a color change temperature curve such as that given in FIG. 4.

Likewise, a comparison between Example 14 and Comparative Example 12 shows that the pigment of Example 14 had a hysteresis range ($\Delta H$) narrower by 2.0° C. than that of the pigment of Comparative Example 12. The pigment of Example 14 showed a color change temperature curve such as that given in FIG. 4.

Likewise, a comparison between Example 15 and Comparative Example 12 shows that the pigment of Example 15 had a hysteresis range ($\Delta H$) narrower by 2.0° C. than that of the pigment of Comparative Example 12. The pigment of Example 15 showed a color change temperature curve such as that given in FIG. 4.

Likewise, a comparison between Example 16 and Comparative Example 12 shows that the pigment of Example 16 had a hysteresis range ($\Delta H$) narrower by 7.0° C. than that of the pigment of Comparative Example 12. The pigment of Example 16 showed a color change temperature curve such as that given in FIG. 2.

Likewise, a comparison between Example 17 and Comparative Example 13 shows that the pigment of Example 17 had a hysteresis range ($\Delta H$) narrower by 3.0° C. than that of the pigment of Comparative Example 13. The pigment of Example 17 showed a color change temperature curve such as that given in FIG. 4.

Likewise, a comparison between Example 18 and Comparative Example 14 shows that the pigment of Example 18 had a hysteresis range ($\Delta H$) narrower by 3.0° C. than that of the pigment of Comparative Example 14. The pigment of Example 18 showed a color change temperature curve such as that given in FIG. 4.

Likewise, a comparison between Example 19 and Comparative Example 15 shows that the pigment of Example 19 had a hysteresis range (ΔH) narrower by 7.5° C. than that of the pigment of Comparative Example 15. The pigment of Example 19 showed a color change temperature curve such as that given in FIG. 2.

Likewise, a comparison between Example 20 and Comparative Example 16 shows that the pigment of Example 20 had a hysteresis range (ΔH) narrower by 5.5° C. than that of the pigment of Comparative Example 16. The pigment of Example 20 showed a color change temperature curve such as that given in FIG. 2.

Likewise, a comparison between Example 21 and Comparative Example 9 shows that the pigment of Example 21 had a hysteresis range (ΔH) narrower by 3.5° C. than that of the pigment of Comparative Example 9. The pigment of Example 21 showed a color change temperature curve such as that given in FIG. 2.

The invention can provide thermochromic microencapsulated pigments which can have delicately regulated color change temperatures and are applicable to a variety of fields including temperature indication, decoration, toys, and training elements.

When the microencapsulated pigments have a small particle diameter, they are excellent not only in the delicate regulation of color change temperatures but in the thermochromic function of showing a distinct color change. These thermochromic microencapsulated pigments are therefore applicable to a wide range of applications including inks for writing utensils, inks for spraying, process printing inks for high-mesh separation, and gravure inks.

While the invention has been described in detail and with reference to specific embodiments thereof, it will be apparent to one skilled in the art that various changes and modifications can be made therein without departing from the spirit and scope thereof.

This application is based on Japanese patent applications No. Hei-11-263391, filed on Sep. 17, 1999, and No. 2000-129591, filed on Apr. 28, 2000, incorporated herein by reference.

What is claimed is:

1. A thermochromic microencapsulated pigment which comprises as four essential components (a) an electron-donating chromatic organic compound, (b) an electron-accepting compound, (c) a reaction medium determining temperatures at which color reactions of component (a) with component (b) take place and being selected from the group consisting of sulfides, ethers, ketones, esters, and acid amides, and (d) a color change temperature regulator, said color change temperature regulator (d) comprising one or more compounds selected from the group consisting of esters, alcohols, ketones, acid amides, hydrocarbons, and fatty acids, and contained in an amount of from 0.01 to 0.3 part by weight per part by weight of the reaction medium (c) and having a melting point Y (° C.) satisfying the relationship $(X+30)° C. \leq Y \leq 200° C.$, wherein X (° C.) is the melting point of component (c), and said four essential components being microencapsulated.

2. The thermochromic microencapsulated pigment according to claim 1, wherein the color change temperature regulator (d) is selected from the group consisting of aliphatic esters, aliphatic ketones, aliphatic alcohols, aliphatic acid amides, and saturated fatty acids.

3. The thermochromic microencapsulated pigment according to claim 1, which has an average particle diameter in the range of from 0.01 to 6 μm.

4. The thermochromic microencapsulated pigment according to claim 1, which gives a temperature-color density curve showing that the pigment undergoes color changes with a hysteresis range (ΔH) of 5° C. or narrower.

5. A thermochromic microencapsulated pigment which comprises as four essential components (a) an electron-donating chromatic organic compound, (b) an electron-accepting compound, (c) a reaction medium determining temperatures at which color reactions of component (a) with component (b) take place and being selected from the group consisting of sulfides, ethers, ketones, esters, and acid amides, and (d) a color change temperature regulator, said color change temperature regulator (d) comprising one or more compounds selected from the group consisting of ethers, esters, ketones, acid amides, and fatty acids, and contained in an amount of from 0.01 to 0.3 part by weight per part by weight of the reaction medium (c) and having a melting point Y (° C.) satisfying the relationship $(X+16)° C. \leq Y \leq (X+100)° C.$, wherein X (° C.) is the melting point of component (c), and said four essential components being microencapsulated, and which gives a temperature-color density curve showing that the pigment undergoes color changes with a hysteresis range (ΔH) having a width of from 5° C. to 80° C., and in which the colors thereof respectively in a range of temperatures not higher than a lower trigger temperature and in a range of temperatures not lower than a higher trigger temperature are alternately memorized and retained by the pigment in the temperature range between the lower trigger temperature and the higher trigger temperature.

* * * * *